No. 642,509. Patented Jan. 30, 1900.
C. TROUP.
AUTOMATIC COUPLING FOR RAILWAY CARS.
(Application filed Nov. 21, 1898.)
(No Model.)
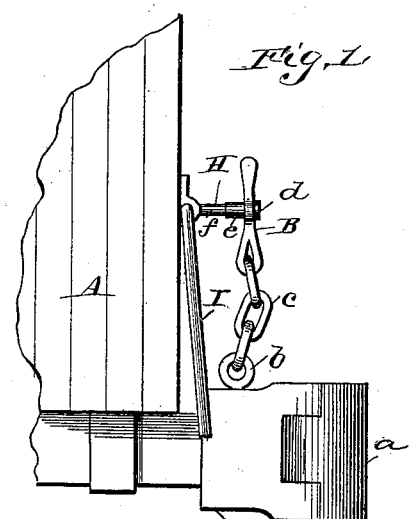
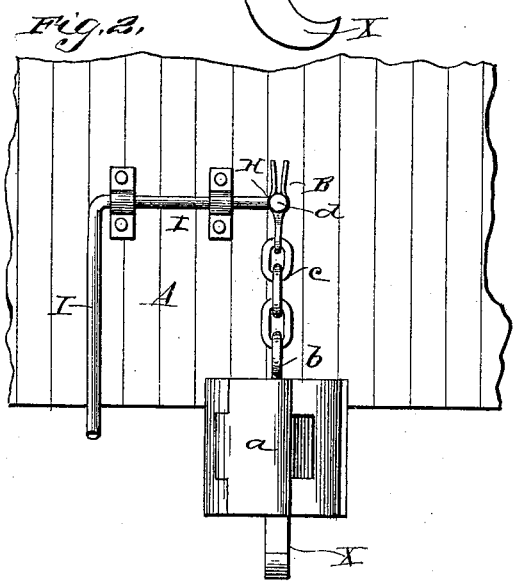
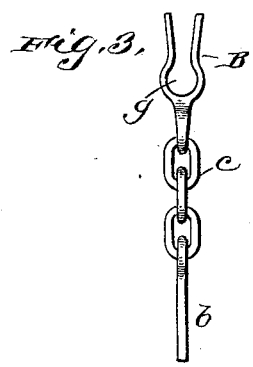
Witnesses
E. C. Vancenpoorten
Fred W. Tovry
Inventor:
Charles Troup

UNITED STATES PATENT OFFICE.

CHARLES TROUP, OF WATSEKA, ILLINOIS, ASSIGNOR OF THIRTY-SEVEN ONE-HUNDREDTHS TO THOMAS J. AURAND, OF SAME PLACE.

AUTOMATIC COUPLING FOR RAILWAY-CARS.

SPECIFICATION forming part of Letters Patent No. 642,509, dated January 30, 1900.

Application filed November 21, 1898. Serial No. 697,121. (No model.)

*To all whom it may concern:*

Be it known that I, CHARLES TROUP, a citizen of the United States, residing at Watseka, in the county of Iroquois and State of Illinois, have invented new and useful Attachments for Automatic Couplers for Railway-Cars, of which the following is a specification.

The invention relates to an improved attachment for the chain to which the coupling-pin employed in the clasp of automatic pivoted jaw-couplers is ordinarily secured. I so attach said chain to an arm projecting from the end of a car directly over the coupler as to permit its disengagement in case the draw-bar is pulled out accidentally.

In the accompanying drawings, Figure 1 is a side view of one end of a freight-car provided with my improvement. Fig. 2 is an end view of the same. Fig. 3 is a plan view of the detachable chain to which the jaw or coupling-pin is attached.

The car-body A is shown provided with that variety of coupler having a pivoted or hinged jaw $a$, adapted to swing horizontally. The same is provided with a pendent forwardly-extended and curved part or projection X, which will support the draw-bar in case it should become accidentally detached, and thus prevent the bars or coupling devices falling upon the track, whereby they might derail or injure the cars.

The pin $b$, employed for securing or locking the pivoted coupling-jaw, is attached to a chain $c$, which is provided at the other end with an open spring clasp or clip B, the same being substantially U shape—that is to say, the clip is bifurcated, and the inner or closed end $g$ of its slot is made wider than at any other point. This clip is adapted for application to the lever-arm H, which is part of a rocking lever I, used for lifting the pin $b$. Said arm H projects horizontally forward from the end of the car A. It has an enlarged head $d$ and an adjacent reduced portion $e$ and a still more reduced portion $f$, which is farthest from the head $d$. The space between the jaws or arms of the spring-clip B allows the smallest part $f$ of arm H to pass between them and enter the enlarged portion $g$ of the clip. Then the clip is moved on part $e$ toward the head $d$, so as to hang on part $e$, whose thickness is such as to prevent it passing out between the jaws of the clip. The head $d$ of arm H is also larger than the space $g$, and hence the clip cannot slip off the end of arm H. The normal position of the clip is shown in Figs. 1 and 2. The elasticity of the clip B is such that if the draw-bar should be accidentally pulled out wholly or partly the tension on the chain $c$ will release the clip from lever-arm H, since its arms or jaws will then yield sufficiently to allow the portion $e$ of said arm to pass out between them. Thus breaking of any of the attachments described, which would occur if the chain were permanently connected with the lever-arm H, is avoided.

What I claim is—

1. The combination with a car, a coupling device, and a projection, on the former, having a reduced portion and head as specified, of a chain and a spring clip or clasp attached thereto, and adapted to be engaged with and disengaged from said projection, as specified.

2. The combination with the car, a coupling, and a lever-arm projecting from the car above the coupling, and having two reduced portions and a head, of a chain and pin, and a bifurcated spring clip, or clasp, attached to said chain and having the slot between its jaws made wider at the closed end than elsewhere, and of less diameter than the aforesaid head and one of the reduced portions of said arm, as shown and described.

CHARLES TROUP.

Witnesses:
J. H. CAREY,
E. C. VANDERPOORTEN.